United States Patent
Wang et al.

(10) Patent No.: US 9,218,412 B2
(45) Date of Patent: Dec. 22, 2015

(54) SEARCHING A DATABASE OF LISTINGS

(75) Inventors: Ye-Yi Wang, Redmond, WA (US); Dong Yu, Kirkland, WA (US); Yun-Cheng Ju, Bellevue, WA (US); Alejandro Acero, Bellevue, WA (US); Geoffrey G. Zweig, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1369 days.

(21) Appl. No.: 11/746,847

(22) Filed: May 10, 2007

(65) Prior Publication Data

US 2008/0281806 A1 Nov. 13, 2008

(51) Int. Cl.
| | |
|---|---|
| *G06F 7/00* | (2006.01) |
| *G06F 17/30* | (2006.01) |
| *G06F 3/06* | (2006.01) |
| *G10L 15/187* | (2013.01) |
| *G10L 15/197* | (2013.01) |

(52) U.S. Cl.
CPC ........ *G06F 17/30663* (2013.01); *G06F 3/0641* (2013.01); *G06F 17/3069* (2013.01); *G10L 15/187* (2013.01); *G10L 15/197* (2013.01)

(58) Field of Classification Search
CPC .................................................... G06F 3/0641
USPC ................................................. 707/713, 736
See application file for complete search history.

(56) References Cited

U.S. PATENT DOCUMENTS

| | | | |
|---|---|---|---|
| 5,479,488 | A | 12/1995 | Lennig et al. |
| 5,638,425 | A | 6/1997 | Meador, III et al. |
| 5,943,417 | A | 8/1999 | Cox et al. |
| 5,987,408 | A | 11/1999 | Gupta |
| 6,073,095 | A * | 6/2000 | Dharanipragada et al. ... 704/242 |
| 6,189,003 | B1 | 2/2001 | Leal |
| 6,643,640 | B1 * | 11/2003 | Getchius et al. .................. 707/3 |
| 6,681,222 | B2 * | 1/2004 | Kabra et al. ...................... 707/5 |
| 6,757,692 | B1 * | 6/2004 | Davis et al. ................. 707/104.1 |
| 6,826,559 | B1 * | 11/2004 | Ponte .................................. 707/3 |
| 6,999,563 | B1 * | 2/2006 | Thorpe et al. ................. 379/67.1 |
| 7,076,484 | B2 * | 7/2006 | Dworkis et al. ................... 707/5 |
| 2002/0165873 | A1 * | 11/2002 | Kwok et al. ................... 707/500 |
| 2002/0174101 | A1 * | 11/2002 | Fernley et al. ..................... 707/1 |
| 2003/0112729 | A1 * | 6/2003 | Nichols et al. ............. 369/53.22 |
| 2003/0130998 | A1 * | 7/2003 | Fox et al. ........................... 707/3 |
| 2003/0187649 | A1 * | 10/2003 | Logan et al. .................. 704/260 |
| 2004/0010518 | A1 | 1/2004 | Montemer |
| 2004/0024754 | A1 | 2/2004 | Mane et al. |
| 2004/0132433 | A1 | 7/2004 | Stern et al. |
| 2005/0015307 | A1 | 1/2005 | Simpson et al. |
| 2005/0102251 | A1 * | 5/2005 | Gillespie ........................... 707/1 |
| 2005/0169364 | A1 * | 8/2005 | Singh ............................ 375/240 |

(Continued)

OTHER PUBLICATIONS

Jing et al. ("Improved Feature Selection Approach TFIDF in Text Mining", Nov. 2002, IEEE, pp. 944-946).*

(Continued)

*Primary Examiner* — Mariela Reyes
*Assistant Examiner* — Dawaune Conyers
(74) *Attorney, Agent, or Firm* — Alin Corie; Mike Allen; Micky Minhas

(57) ABSTRACT

A database having listings rather than long documents is searched using a term frequency-inverse document frequency (Tf/Idf) algorithm.

14 Claims, 13 Drawing Sheets

(56) References Cited

U.S. PATENT DOCUMENTS

2006/0093120 A1 5/2006 Thorpe et al.
2006/0242142 A1* 10/2006 Coen et al. .................... 707/6

OTHER PUBLICATIONS

Jan et al., "Automatic Construction of Unique Signatures and Confusable Sets for Natural Language Directory Assistance Applications", 2003.*

Minka, "Make Character Strings Unique", 2005, R Documentation.*

L. Boves, D. Jouvet, J. Sienel, R. de Mori, F. Bechet, L. Fissore, and P.Laface, *ASR for automatic directory assistance: the SMADA project*, In: Proceedings: ESCA ITRW Automatic Speech Recognition. Challenges for the new millennium. Paris: LIMSI-CNRS, 2000, pp. 249-254.

den Os, E., de Koning, N., Jongebloed, H. and Boves. L.: *Usability of a Speech-Centric Multimodal Directory Assistance Service*. Proc. of the CLASS Workshop on Information Presentation and Natural Multimodal Dialogs, Verona, Italy, 2001, 65-69.

Béchet, F., den Os, E. Boves, L., Sienel, J. "Introduction to the IST-HLT project Speech-driven Multimodal Automatic Directory Assistance (SMADA)", *Proc. ICSLP-2000*, Beijing.

Levin, E., and Mane, A.M., "Voice User Interface Design for Automated Directory Assistance",in Proc. INTERSPEECH,2005, vol. 3,pp. 2509-2512.

A scalable architecture for directory assistance automation, Natarajan, P.; Prasad, R.; Schwartz, R.M.; Makhoul, J. , (ICASSP '02). IEEE International Conference, 2002, pp. I-21-I-24 vol. 1.

Kellner,A.,et al.,"using Combined Decisions and Confidence Measures for Name Recognition in Automatic Directory Assistance systems", in Proc.ICSLP,1998,pp. 2589-2862.

Seide,F.,and Kellner,A.,"Towards an Automated Directory Information System", in Proc.Eurospeech,1997,vol. 3,pp. 1327-1330.

Scharenborg,O.,Sturm,J.,Boves,L., Business Listings in Automatic Directory Assistance Directory Assistance, in Proc.Eurospeech 2001,pp. 2381-2384.

Automation of Telecom Italia directory assistance service: field trial results, Billi, R.; Canavesio, F.; Rullent, C. , Interactive Voice Technology for Telecommunications Applications, 1998. IVTTA '98. Proceedings. 1998 IEEE 4th Workshop, vol., Iss., Sep. 29-30, 1998, pp. 11-16.

* cited by examiner

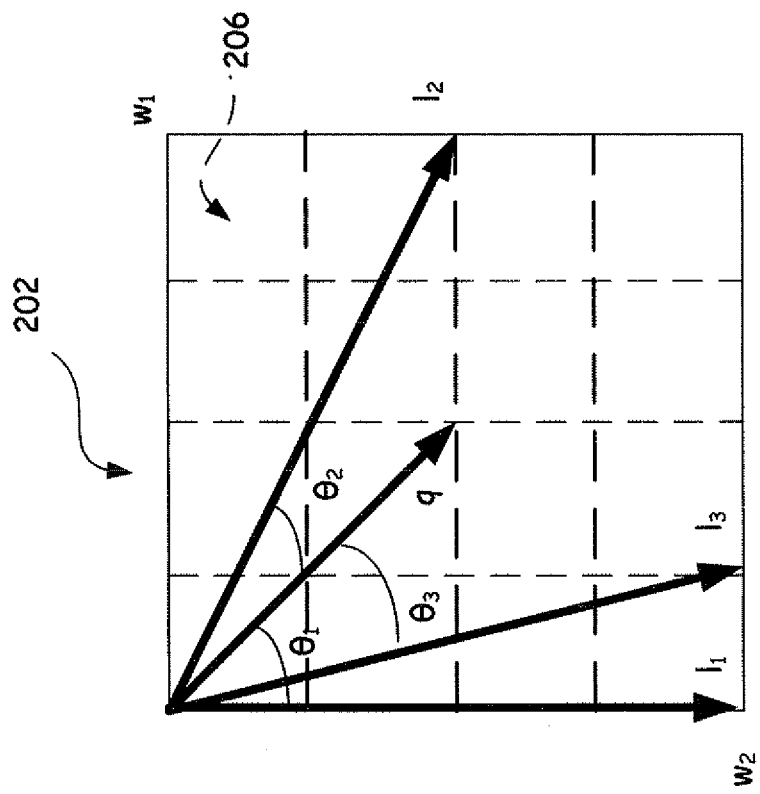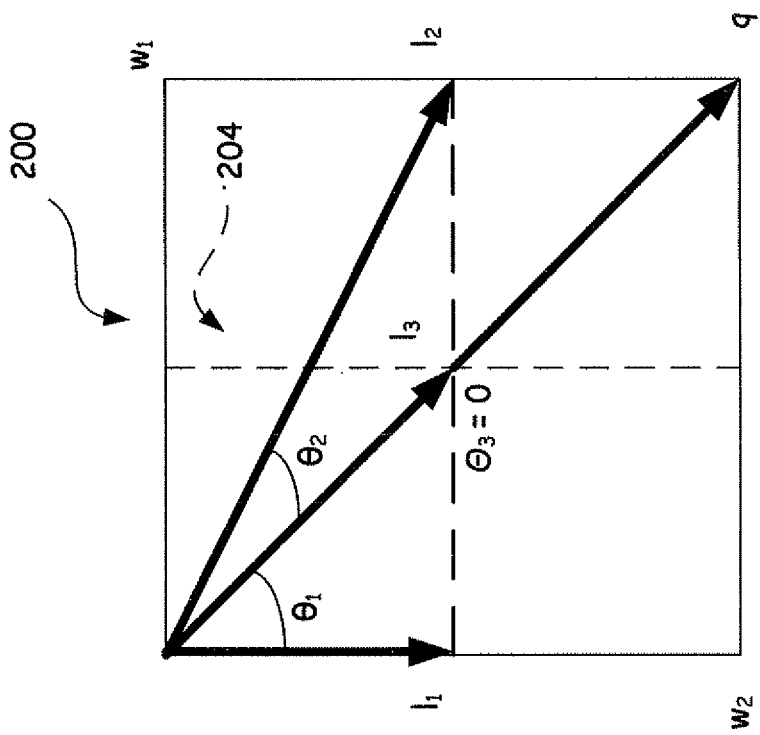
FIG. 2

SEARCHING A DATABASE OF LISTINGS

BACKGROUND

The discussion below is merely provided for general background information and is not intended to be used as an aid in determining the scope of the claimed subject matter.

An automated directory assistance (DA) system is typically a spoken dialog system that provides a caller with the phone number and/or address of a desired business, government or residential listing. The DA system can be used to complement or replace the traditional human operated 411 services in order to cut cost.

A typical DA system includes two components, a speech recognizer and a search module. The speech recognizer receives a user's utterance and transforms it into text form. The text then serves as the basis for a query that is used by the search module in order to find the desired listing in a database of listings.

Due to errors made by the speech recognizer and the search module, the chance of finding the desired listing is typically well below 30% in most current DA systems if no special measure is taken to improve the search module. Speech recognition is nowhere near perfect. In fact, even using a domain specific language model (LM) trained with all listings for a given city, the speech recognizer may still have a word error rate (WER) of about 70% under some conditions. However, the search module often relies on exact matching of the query and the listing, and hence, is not robust to speech recognition errors.

Another source of errors is due to variations in users' references to listings. For example, the listing "Kung Ho Cuisine of China" is often referred to as "Kung Ho restaurant" or "Kung Ho Chinese restaurant." Users' utterances often contain other information in addition to a business name, such as the spelling of the name or the street it is on.

Yet another source of errors is due to inconsistent text normalization for listings in the database. For example, 5 in "Big 5 Sporting Goods" is not normalized, while 9 in "K nine" is. So no matter whether inverse text normalization (ITN) is performed on ASR outputs or not, some queries will not match the listings on those terms.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect herein described is a computer system for searching a database such as but not limited to DA system. The database comprises a plurality of listings, which are not long documents, but rather, each listing is a small plurality of terms. A query recognizer receives a query from a user. The query recognizer can take numerous forms. For example, the query recognizer can be a speech recognizer, handwriting recognizer or simply a module that takes text in such as through a keyboard and formulates a query.

A search module receives the output from the query recognizer and uses it as a basis for searching the database for listing(s) matching the query. In particular, the search module uses a cosine similarity metric of a vector-space model, with vector elements weighted by term frequency-inverse document frequency (Tf/Idf) scores. (Henceforth the search module is referred to as "Tf/Idf algorithm"). Use of the Tf/Idf algorithm in a DA system, or in use with other databases having listings or information similar to a listing is scalable and robust.

BRIEF DESCRIPTION OF THE DRAWINGS

FIG. 2 is a pictorial illustration of vector spaces.

DETAILED DESCRIPTION

Figure 1:
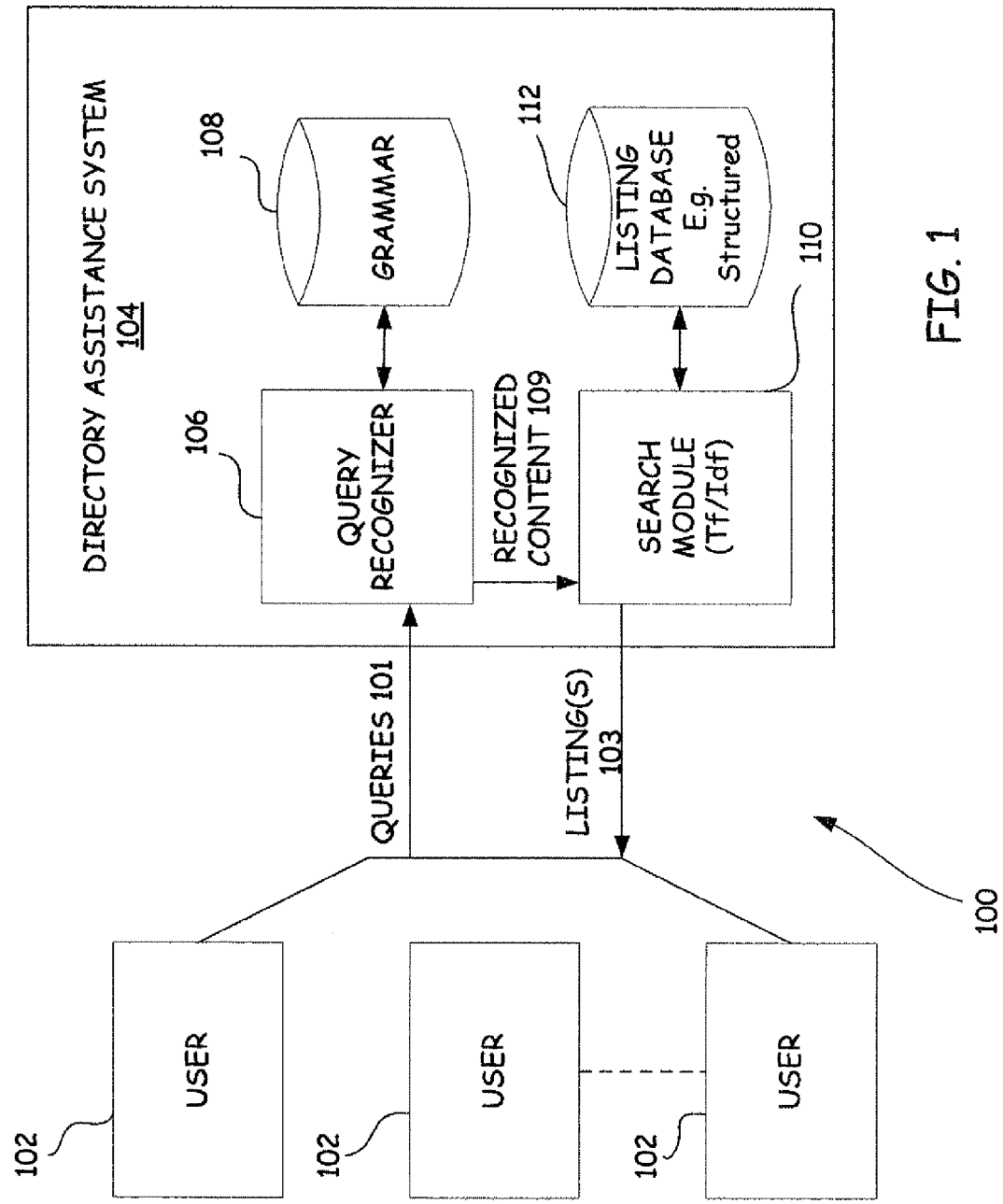
FIG. 1 is schematic diagram of a directory assistance environment.

FIG. 1 is schematic diagram of a directory assistance (DA) environment 100. Environment 100 includes a plurality of users 102 (an illustrative three are shown) that interact with a DA system 104. More specifically, users 102 submit queries 101 to system 104. System 104 processes the queries so as to produce one or more listings 103, which are returned to the user that made the corresponding request. The precise content of queries 101 and listings 103 is not critical to aspects herein described. That being said, in one embodiment, a query 101 can be the name of a person, government agency or business, and a corresponding listing 103 is a phone number, an address, an email address or some other identifier or information corresponding to the listing.

Directory assistance system 104 includes a query recognizer 106 configured to process a query 101 by applying a grammar 108 so as to identify the content of the query. In one embodiment, not by limitation, query recognizer 106 is a speech recognition engine configured to apply a speech recognition grammar 108 so as to recognize the content of a query 101, which is an utterance spoken by a user 102. In another embodiment, query recognizer 106 is a handwriting recognition engine configured to apply a collection of handwriting characteristics 108 so as to recognize the content of a query 101, which is handwriting input by a user 102. In yet another embodiment, query recognizer 106 is a text recognition engine configured to apply a collection of text recognition characteristics 108 so as to recognize the content of a query 101, which is illustratively text input by a user 102. While aspects herein described are not limited to any particular method of recognition, solely for the purposes of illustrating an embodiment, it will be assumed that queries 101 are spoken, that query recognizer 106 is a speech recognition engine, and that grammar 108 is a speech recognition grammar.

The recognized content 109 of a query 101 is provided to a search module or component 110. Component 110 is illustratively configured to compare the recognized content against a database of listings 112. In this manner, component 110 identifies, from the database, one or more listings that match (or sufficiently surpass a pre-established threshold of similarity) the recognized content of the query. These matching listing or listings (i.e., listings 103) are provided to the user that initiated the corresponding query 101.

At this point it should be noted that aspects herein described are not limited to use only with DA system 104, but rather may be beneficial with numerous other database systems having listings, in other words, where each entry or record has a small number of words for example, in one embodiment, less than approximately 25 words. As the number of words in each entry goes down, the aspects herein described become more beneficial so in yet a further embodiment, where each entry has less than approximately 10 words enhanced performance can be realized over current techniques. Without limitation some other databases can include listings or entries related to movies, books, articles, songs, actors, directors, authors, artists, library material, geographical material and financial information to name just a few.

If the recognized content 109 is robustly normalized to the intended listings in the database 112, then better search results will be obtained. Generally, search capability can be provided by a statistical classifier, in which each listing is treated as a classification destination for users' queries 101.

A vector space model is commonly used in information retrieval, where both documents and queries are represented as vectors. The similarity between a document vector and a query vector, often measured as the cosine of the angle between the two vectors, determines the relevance of the document. Each element $w_i$ in a vector w represents the weight (importance) of a term (e.g. a word or a bigram), which can be represented as:

$$w_i = -tf_i * \log(df_i)$$

Where the term frequency $tf_i$ is the frequency that term i occurs in a document, and the document frequency $df_i$ is the frequency of documents that contain term i. The inverse document frequency, $-\log(df_i)$, lowers the importance of a term that occurs frequently across different documents, such as words like "Inc." and "Restaurant" in business listings. This is commonly referred to as a term frequency-inverse document frequency ("Tf/Idf") algorithm.

Given a document vector $w_d$ (in this case, a vector for a canonical business listing) and a query vector $w_q$, the relevance of the document to the query can be measured by:

$$sim(w_d, w_q) = w_d \cdot w_q / |w_d||w_q|$$

The document vectors $w_d$ are constructed from normalized listings. For example, the listing "Big 5 Sporting Goods" can be vectorized as [1*Idf("Big"), 1*Idf("Five"), 1*Idf("Sporting"), 1*Idf("Goods")], where the term frequency for all the 5 words are 1 and the Idf values for the 5 words are pre-computed. The normalization of the words (e.g., "5"→"five") can be implemented according to a lexicon or grammar 108.

In typical information retrieval, documents are generally long. Accordingly, the term frequency of a document reassembles the true statistical distribution underlying the document. Listings, on the other hand, are short in general (typically, one to 25 words), so the term frequency may not represent the distribution well. Hence, a small change in a listing is more likely to yield different search results. This is illustrated in FIG. 2 by examples 200 and 202, where the grids 204 and 206 represent the number of words in each dimension. In example 200, where both listings $l_1$ and $l_2$ are short, adding word $w_1$ to listing $l_1$ results in $l_3$, which points to the same direction as the query q, thus changes the search result. However in example 202, where listings $l_1$ and $l_2$ are longer, adding $w_1$ to $l_1$ results in $l_3$, which is still not as close to the query q as $l_2$, thus the search result is less sensitive to small changes. An example demonstrates this problem: the query "Big 5" intended for "Big 5 Sporting Goods", yielded the listing "5 on 5 Café", where the extra "5" in the listing "5 on 5 Cafe" brings it closer to the query "Big 5".

A first aspect herein described is use of the Tf/Idf search algorithm to retrieve information from a listing database 112 such as in the DA system 104. In one form of prior system, the utterance is directly mapped to the listing(s) by the recognizer. In other words, an acoustic model (AM) probability and a language model (LM) probability is used. In its simplest form, the LM is just a list of the listing names constructed as a probabilistic context free grammar (PCFG), such that the LM path used by the decoder of the speech recognizer indicates the target listing. It has been observed, however, the automation rate of the DA system with this simple formulation is extremely low due to the fact that callers usually don't know, don't remember, or don't say the exact name listed in the directory.

A natural improvement to this DA design is to model the different ways callers actually say a listing. This usually requires collecting a huge number of real calls. Second, the approach is not scalable given that there are numerous ways in which different callers may refer to the same listing. If the application is the U.S. yellow pages, which has 18 million listings, the permutations are virtually endless. As a result, this approach is practical only when the listing database is small.

In contrast, use of the Tf/Idf algorithm in a DA system, or in use with other databases containing listings or information similar to a listing (i.e., where there are a substantial number of entries each of which has approximately 25 or less words, and in a further embodiment, 10 or less words) is scalable and robust. Generally, as a further aspect herein described one or more of the listings is modified to include information, in addition or in substitution for terms present in the listing. This additional information is searchable, thereby increases the dimensions of the vector space. In particular, but optionally, one or more of the techniques described below can be employed, for example, to improve robustness.

Figure 3:
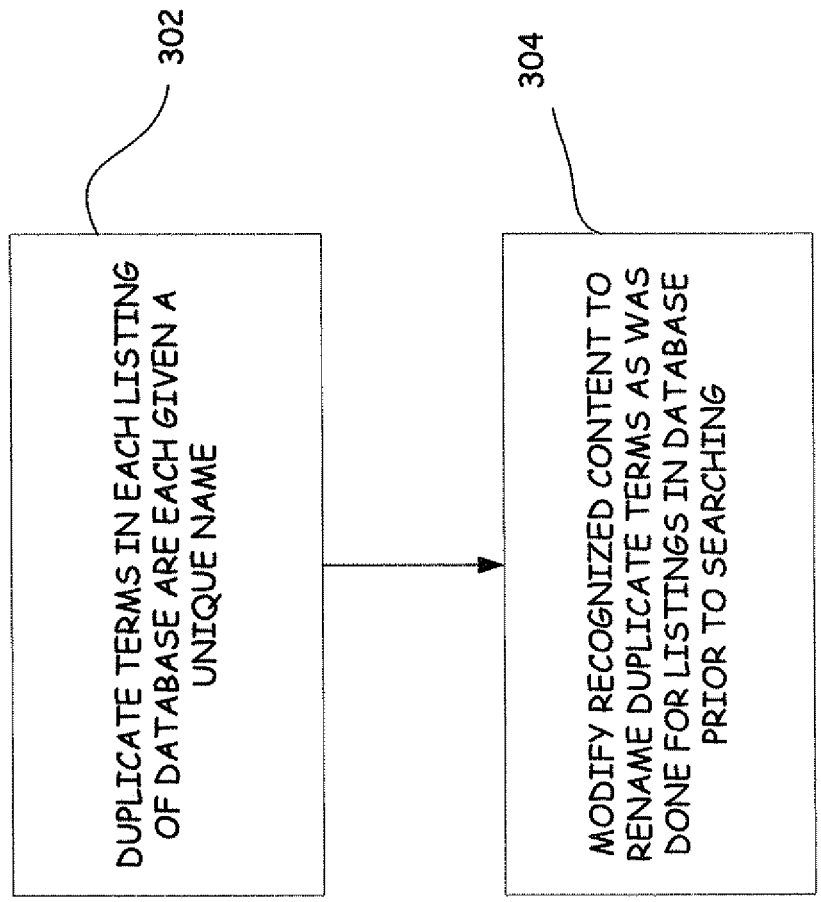
FIG. 3 is a flow chart diagram demonstrating steps associated with eliminating duplicates in a database and a query.
Figure 4:
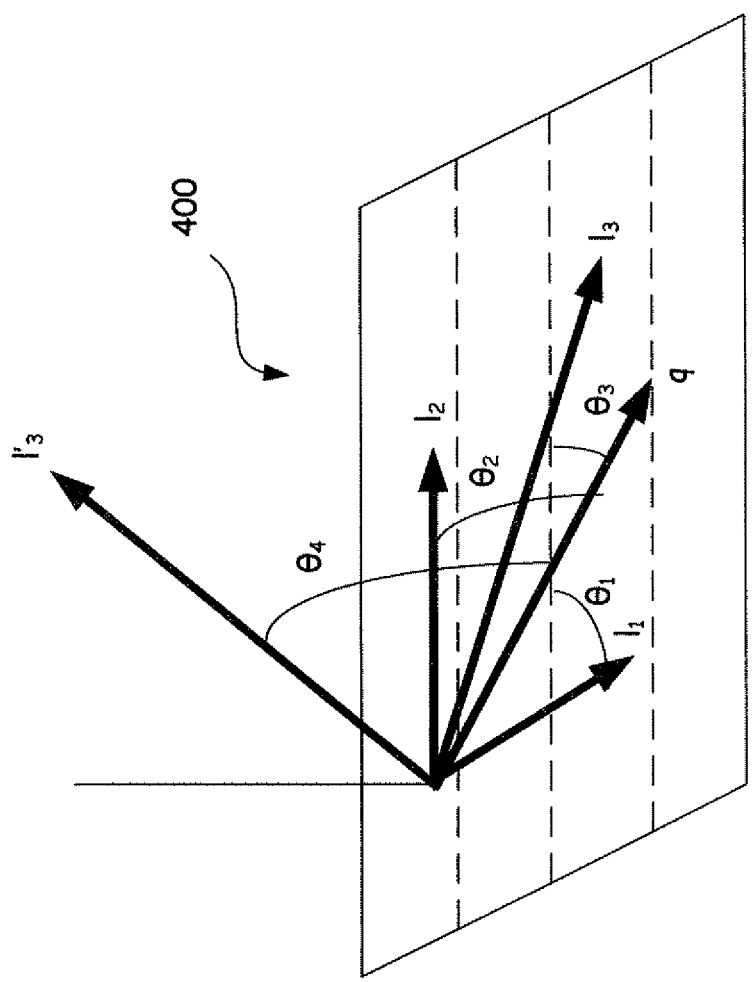
FIG. 4 is a pictorial illustration of vector space.

In a first technique or method illustrated in FIG. 3, duplicate terms (words, numbers, characters, symbols, etc.) if present in a listing of database 112, are renamed so that each term of the listing is unique as indicated at step 302. Similarly, either the query recognizer 106 can modify the recognized content 109 in a manner so that each term is unique, or the search component 110 can receive the recognized content 109 containing duplicate terms and modify it to remove duplicates prior to search at step 304. For instance, assume a business is named "5 on 5 Cafe". The corresponding listing in database 112 could take the form "5 on 5_$2^{nd}$ Café" where the second "5" is now denoted as "5_$2^{nd}$", thereby differentiating it from the first "5". It should be noted this technique is different than increasing the frequency of terms in the listing where the listing would be noted as having two "5"s. Rather by adding a new unique term, this effectively adds another dimension to the vector space. Pictorially, this is illustrated in FIG. 4 at 400 where "q" denotes the user's query, $l_1$ is a first correct listing, while $l_2$ is a second listing having a "5". Increasing the term frequency of "5" in $l_2$ results in listing $l_3$ on the same hyperplane, which makes it more favorable over $l_1$. However, adding the unique term "5_$2^{nd}$" in a new dimension results in vector $l_3'$. Since the idf of this new dimension is much higher, it plays a more important role in query matching. A query q without a duplicate term like "Big 5" will have a larger angle $\theta_4$ from $l_3'$. However, the angle $\theta_4$ will be significantly reduced if the query q does contain the duplicated term.

It should be understood that the manner in which duplicate terms are represented can take numerous forms. The example herein provided (i.e. "_$2^{nd}$", "_$3^{rd}$", etc.) is just one form for purposes of illustration only, and therefore should not be considered limiting.

In some embodiments, database 112 is a structured database. In other words, some if not all entries include data in two or more fields. Using the DA system 104 by way of example, each entry in database 112 would include a first field for the name of the person, business, etc., a second field for the telephone number and one or more fields for the address or portions of the address (street number, street name, city, state, zip code).

Figure 5:
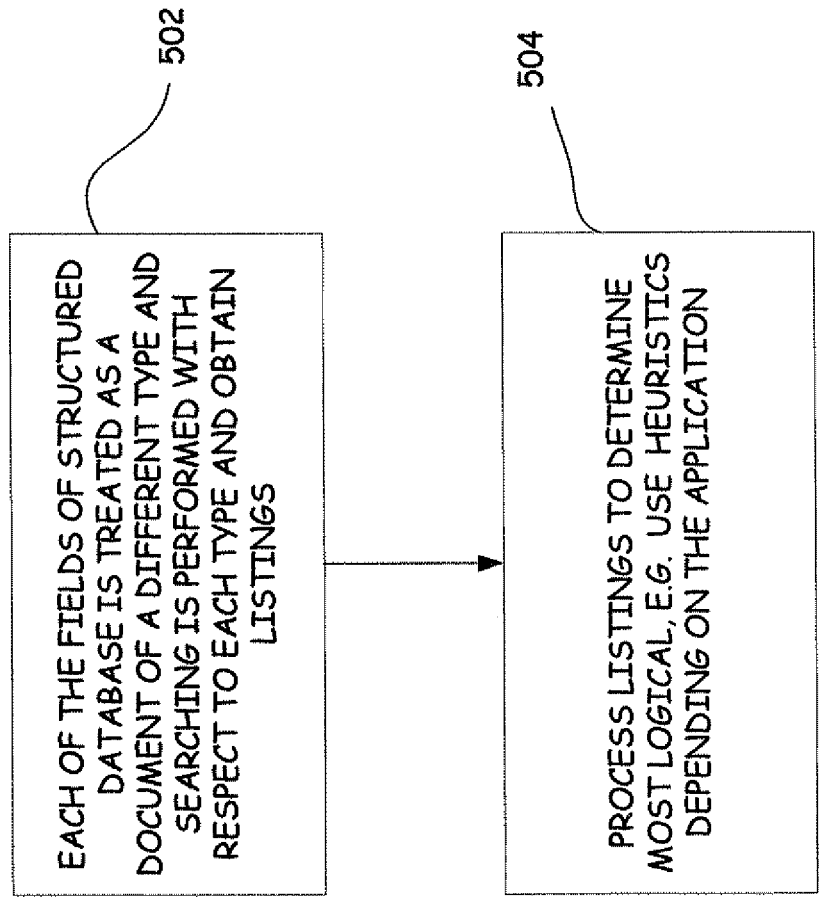
FIG. 5 is a flow chart diagram demonstrating steps associated with searching fields of a structured database and analyzing the results.

Another method illustrated in FIG. 5 is to have search module 110 perform searching with respect to two or more of the fields. In other words, each of the fields is treated as a document of a different type and searching is performed with respect to each type at step 502, where the possible listings are obtained. For example, suppose the recognized content 109 of the user's query was "Starbucks on Main". A search on the business names field would yield entries with "Starbucks" well. Similarly, a search on the street name field would match those with "Main" well. However, the search on the business names field may also yield "Main Street Furniture" as a possible listing. Each of the possible listings would then be further processed at step 504 by searching module 110 employing heuristics depending on the application. In the DA system 104 example, each listing would be analyzed to compare terms with respect to the fields searched. For the query above, the business names field would be checked to see if "Starbucks" appears, while the street name field would be checked to see if "Main" appears. As the assigned terms and fields coincide, the probability that the listing is correct increases. So a possible listing of "Starbucks on Watertown Road" would not be discarded assuming "Watertown Road" does appear in the street name field, but "Main Street Furniture" would be discarded because although "Main Street" would be found in the business name field, "Furniture" would not appear as a valid street name.

It should be noted suitable forms of word normalization (e.g. "5" to "five") and/or word breaking (e.g. "outback" to "out" and "back") can be used by search module 110 (as well for recognition by query recognizer 106), if desired, but further elaboration is not necessary for purposes of this description.

Figure 6:
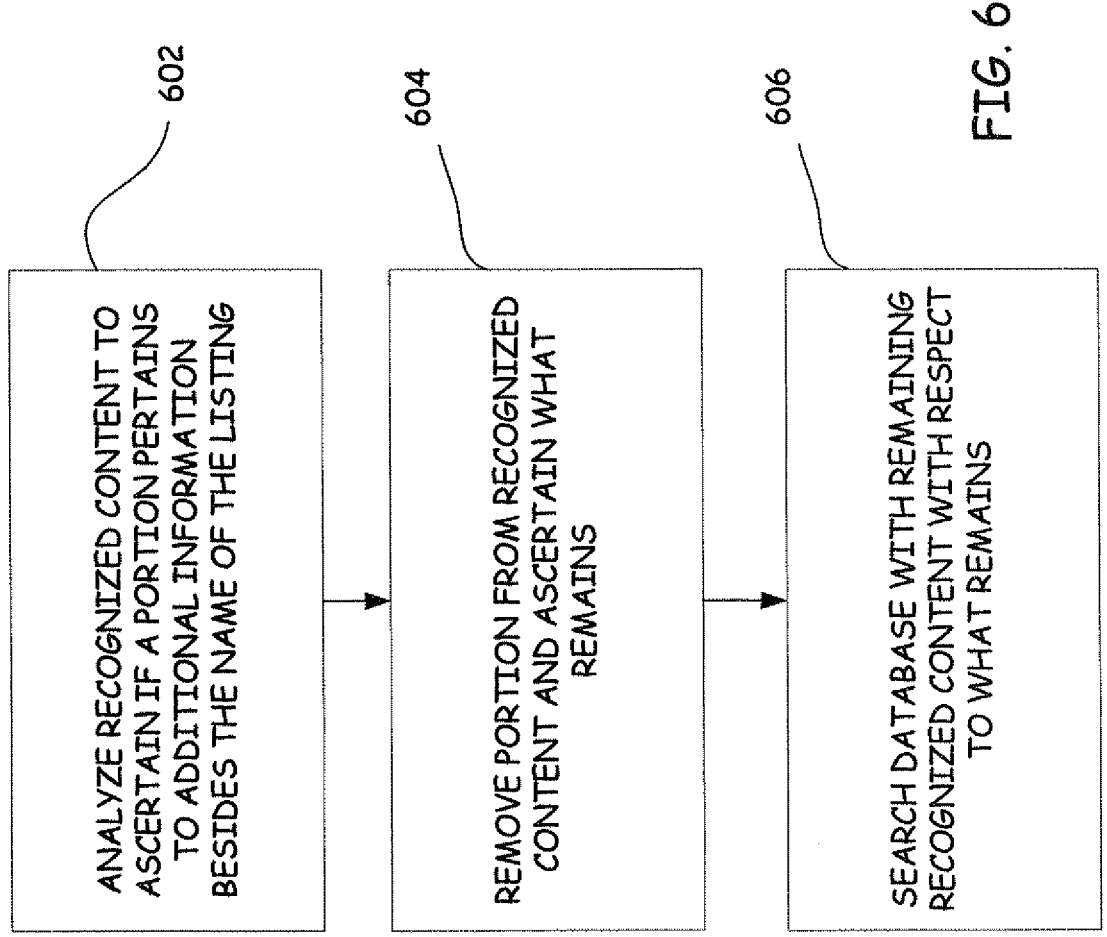
FIG. 6 is a flow chart diagram demonstrating steps associated with analyzing a query and searching after removing a term.

FIG. 6 illustrates a method where the query is reduced if it is known that a portion of the query pertains to particular information that may or may not relate to a field of the structured database 112. At step 602, the recognized content 109 is analyzed by the search module 110, for example, using heuristics, to ascertain if a portion of the recognized content 109 pertains to some type of information in addition to the name of the desired listing. For instance, it may be possible to recognize that the words following "on" in a DA system probably relates to an address. Thus, this information can be removed from the recognized content 109 at step 604 and the balance of the recognized content 109 then can be searched at step 606 against the business name field of the database 112.

Figure 7:
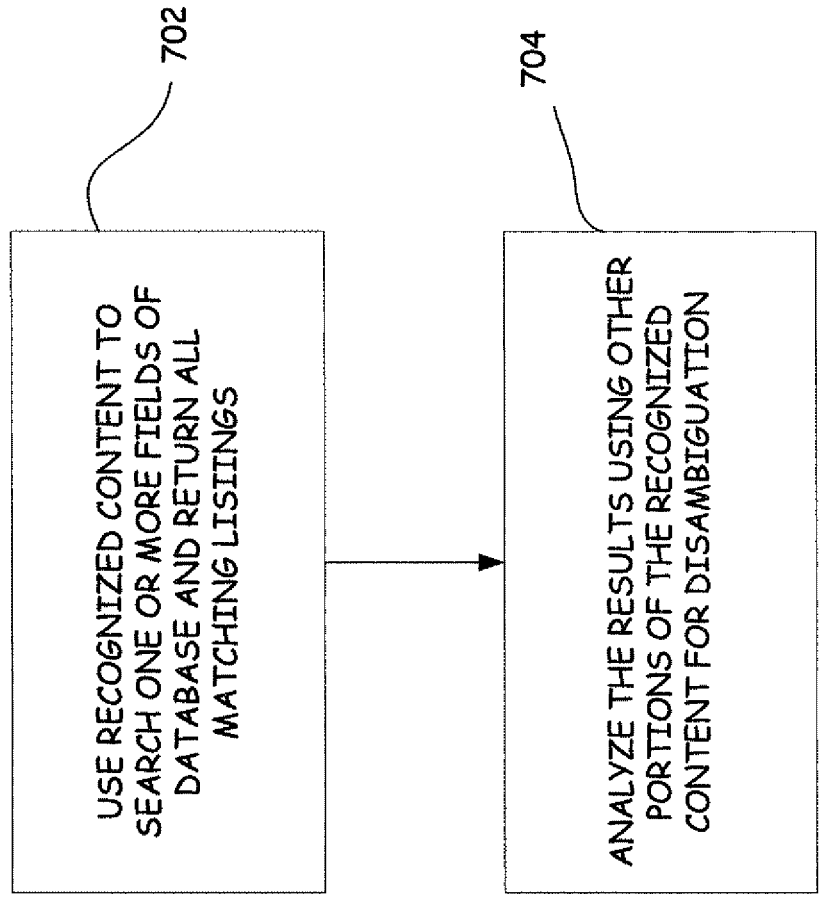
FIG. 7 is a flow chart diagram demonstrating steps associated with searching fields of a structured database and analyzing the results.

Similarly, a portion of the query can be used for disambiguation as illustrated in FIG. 7. At step 702, the search module 110 would use the recognized content 109 to search one or more of the fields of database 112 and return all matching listings. In the example of "Starbucks on Main" it is possible that all listings having "Starbucks" would be returned. At step 704, the search module 110 would then analyze the results using other portions of the recognized content 109 for disambiguation. Using the example above, it may be possible to recognize that the words following "on" in a DA system probably relates to an address. Thus, those listings having "Main" in the address field(s) of the database 112 would be ranked highest.

Figure 8:
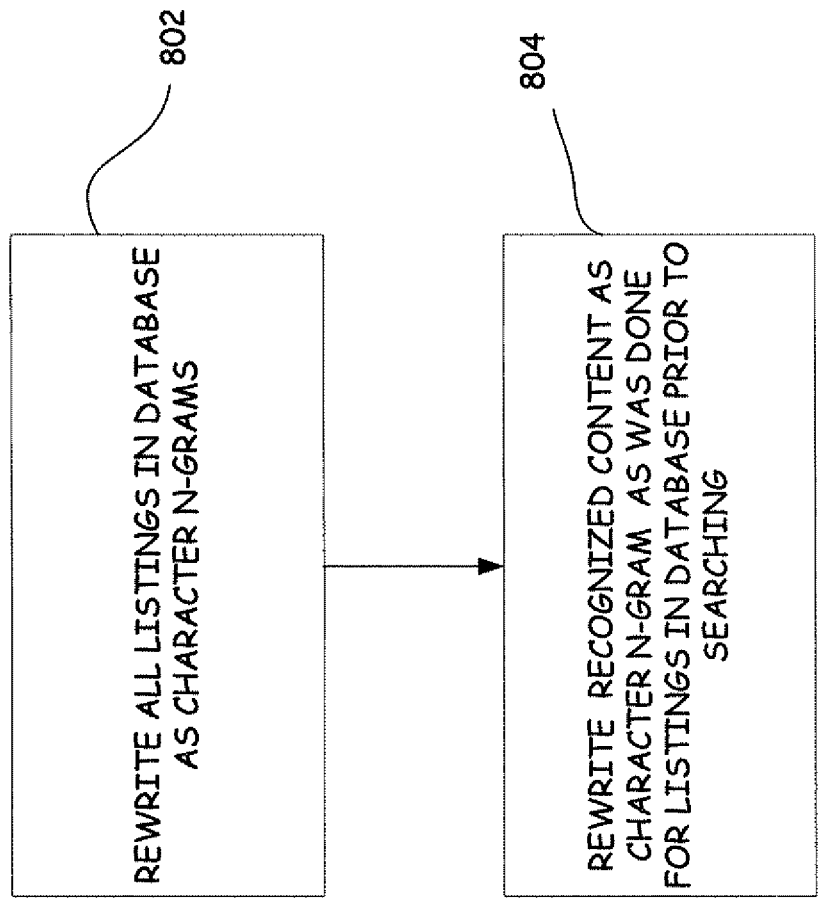
FIG. 8 is a flow chart diagram demonstrating steps associated with using a database having listings based on character n-grams.

The next two following techniques are particularly beneficial for making the search robust to speech recognition errors. In a first technique, instead of using words as indexing units (terms) in the Tf/Idf search, character n-grams are used. Referring to FIG. 8, at step 802, each listing such as the business name is rewritten as a character n-gram. For example, suppose a business was named "Lime Wire" rewritten as a sequence of character 4-grams this would be $Lim Lime ime_ me_W e_Wi _Wir Wire ire$, where "$" indicates the start and the end of the listing and "_" indicates separation of words in the n-gram sequence. At step 804, the query is received from the user and either the query recognizer 106 can modify the recognized content 109 in a manner so that the same character n-gram format is used, or the search component 110 can receive the recognized content 109 and generate the appropriate character n-grams from the recognized content 109 prior to searching. It should be apparent that the character n-gram technique can significantly increase the dimensions of the vector space over using each complete term in the query. In addition, the overlapping units of the character n-gram significantly help in finding the correct listings that are acoustically similar to a misrecognized business name when the recognition error is due to the acoustic similarity—a very common case scenario of misrecognition.

Figure 9:
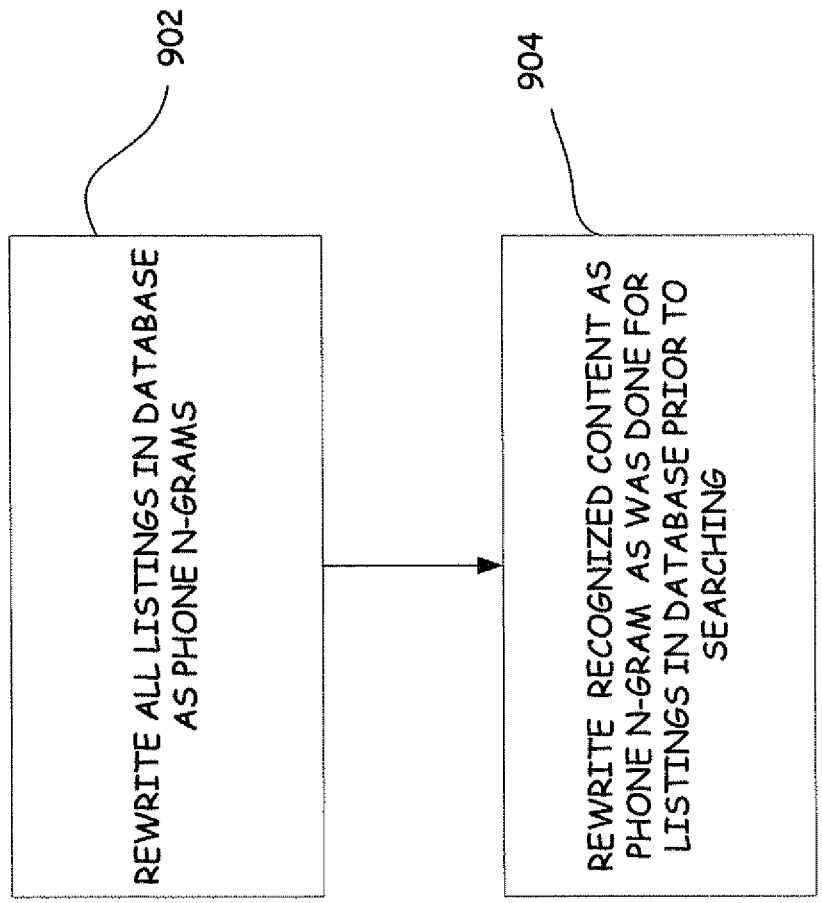
FIG. 9 is a flow chart diagram demonstrating steps associated with using a database having listings based on phone n-grams.

In the second technique, instead of using character n-grams as indexing units in the Tf/Idf search, phone n-grams are used. Referring to FIG. 9, at step 902, each listing such as the business name is rewritten as phone n-grams. Again, using the business named "Lime Wire", the phone sequence is "L AI M W AI AX rho", which like the character n-gram above, can be written as a phone 4-gram sequence as $_L_AI_M L_AI_M_W AI_M_W_AI M_W_AI_AX W_AI_AX_rho AI_AX_rho_$, where "$" indicates the start and the end of the listing, "_" indicates separation of phones and spaces indicates separation of the words in the original query listing name. At step 904, the query is received from the user and either the query recognizer 106 can modify the recognized content 109 in a manner so that the same phone n-gram format is used, or the search component 110 can receive the recognized content 109 and generate the appropriate phone n-grams from the recognized content 109 prior to searching. It should be apparent that like the character n-gram technique, the phone n-gram technique can also significantly improve the robustness of the search module to speech recognition errors.

Figure 10:
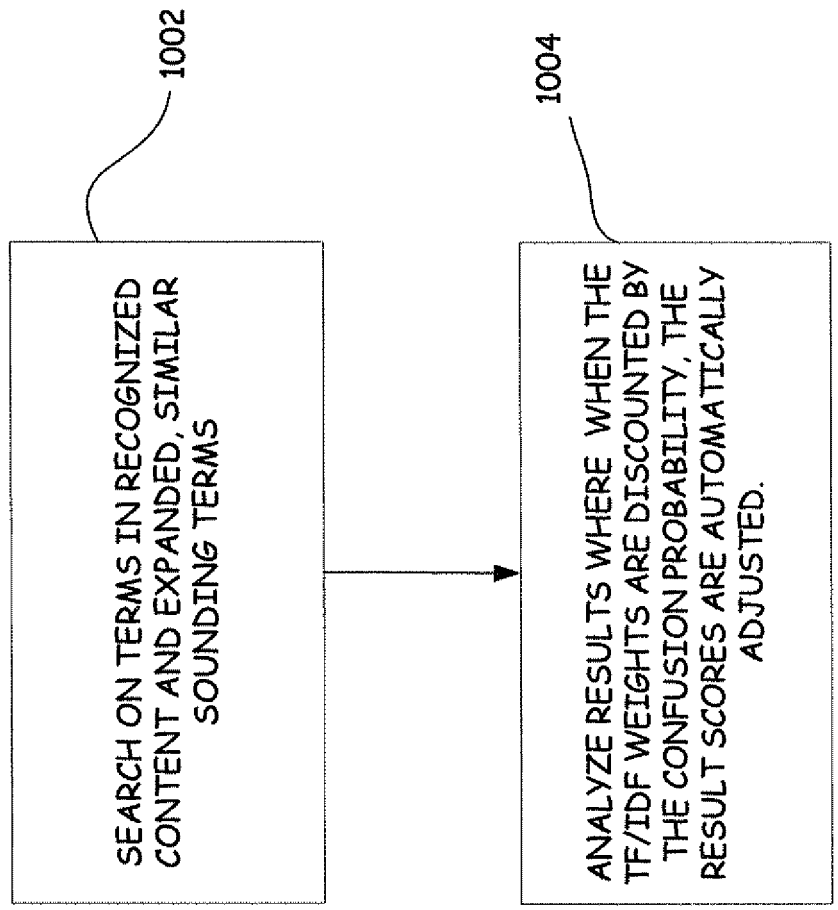
FIG. 10 is a flow chart diagram demonstrating steps associated with using additional terms in the query and analyzing the search results.

In the technique of FIG. 10, a "soft-Tf/Idf" is used where inexact matches between terms are allowed. For example, this can be represented as a dot product between two vectors, where the query and/or the listing vectors are augmented with terms that are acoustically confusable to the terms in the original query/listing, and the Tf/idf weights for the new terms are discounted by the probability that the original term would be recognized as the new terms. In one embodiment, this probability can be computed with a phone error model or a phone confusion matrix as used in speech recognizers. Besides searching based on the terms found in the recognized content 109, in addition, on a term by term basis, similar sounding terms can also be used so as to expand search as indicated at step 1002. In one embodiment, the results, as indicated at step 1004, are analyzed where when the Tf/idf weights are discounted by the confusion probability, the result scores are automatically adjusted.

Figure 11:
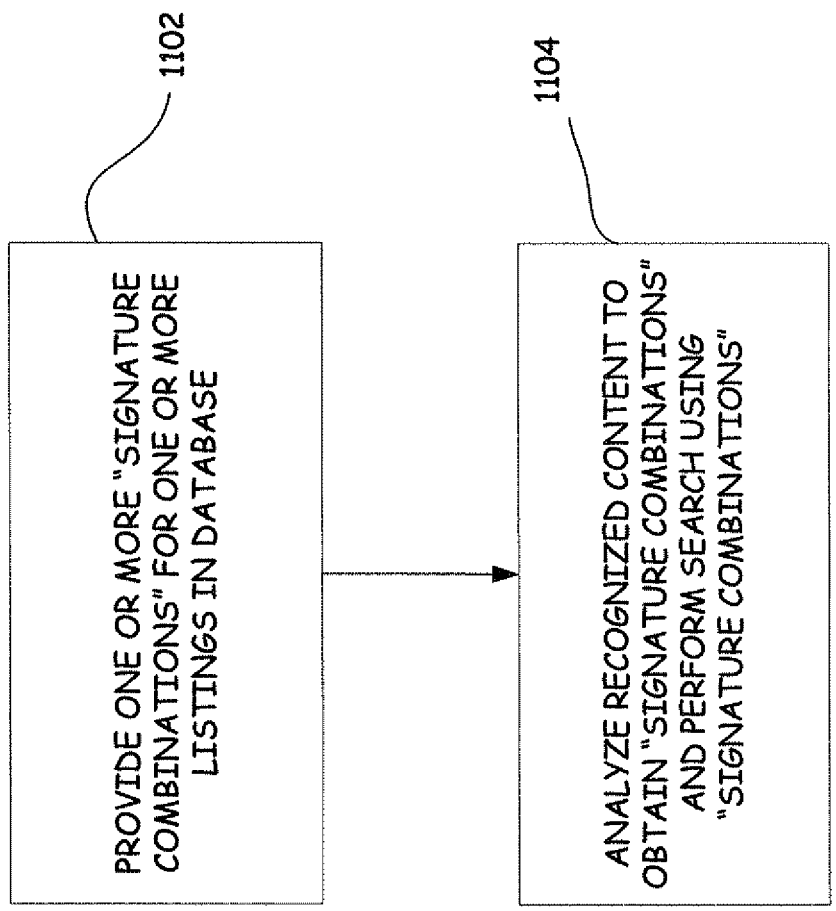
FIG. 11 is a flow chart diagram demonstrating steps associated with searching based on selected or signature combination of terms.

In the technique of FIG. 11, "signature combinations" of terms are used as Tf/Idf features. In contrast to n-gram features, these terms could be non-consecutive terms. For example, the signature combination for the listing "Black and Decker Cyclonic Dust Buster CHV 9600 9.6 Volt Vacuum" could be "Dust_Buster_9.6_volt". At step 1102, one or more of the listings in database 112 could include one or more "signature combinations". At step 1104, the search module 110 would receive the recognized content 109 and perform the search using signature combination(s). In one embodiment, all the terms of the signature combination come from the listing or query, while in another embodiment replacement words can also be used such as "Timothy" instead of "Tim".

Figure 12:
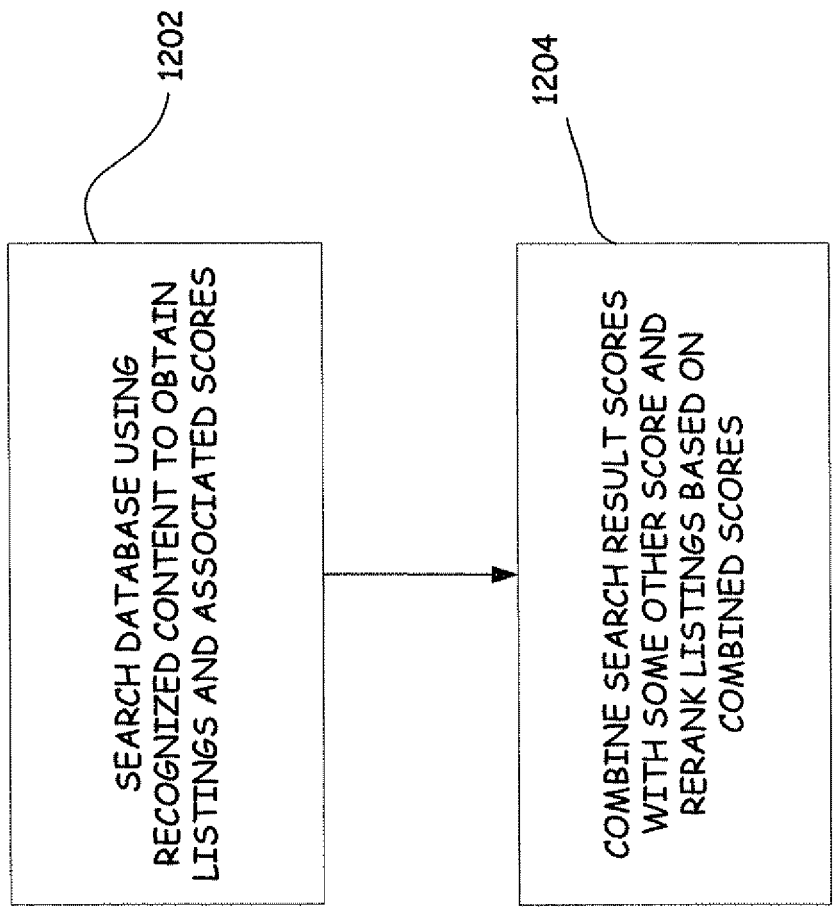
FIG. 12 is a flow chart diagram demonstrating steps associated with combining search scoring results with other scores.

A yet further technique is illustrated in FIG. 12. Generally, the scores returned by the Tf/Idf for each of the listing search results are combined with other scores and where the listing search results are then reranked. Specifically, at step 1202, the recognized content 109 is received by the search module 110, which then uses the Tf/Idf algorithm to search database 112 and to return a list of n-best search results, each having a corresponding score. At step 1204, the scores of the n-best search results are combined with some other score(s). Numerous scores can be used. For example, the query recognizer 106 typically will produce an n-best list of what was believed heard from the user based on grammar 108 and/or acoustic scores. If there exist better matches between other forms of the recognized content 109 and the n-best listing search results, these may be indicative of what the user really wants.

Another type of scoring function that can be used in combination with the Tf/Idf search result scores is a form of "edit distance", for example, character edit distance. Generally, an "edit distance" between two patterns A and B is defined as the minimum number of changes (insertion, substitution or deletion) that have to be done to the first one in order to obtain the second one. If the associated insertion and deletion costs are same, edit distance can be symmetric. For instance, the similarity between each of the string(s) is computed using a modified version of the dynamic programming algorithm for edit-distance calculation (Wagner and M. Fischer. "The String-to-String Correction Problem" *Journal of Association for Computing Machinery.* 1974).

Two measures are provided, normalized Match Ratio (NMR) and Normalized Order Ratio (NOR) as:

$$NMR = \frac{|Character\_Matches|}{|Characters\_in\_a\_Listing|}$$

$$NOR = \frac{|Character\_Matches|}{|Characters\_in\_Query|}$$

Both these measures can be understood intuitively. NMR looks at the number of matches of characters between a listing and the query referenced to the number of characters in the query. Ideally we would want the NMR measure to be one. Clutter in a particular listing is reflected by NOR. If a particular listing has a lot of non-matching characters with the query the denominator increases and thus NOR is inversely proportional to clutter in a particular listing. In one embodiment, the goal is to rank all the search result listings based on a function of their NMR and NOR scores. A simple ranking function RF can be the product of the score from the Tf/Idf algorithm and the combination of the NMR and NOR scores:

$$RF=(NMR+NOR)\times\text{Cosine}(query,listing)$$

Figure 13:
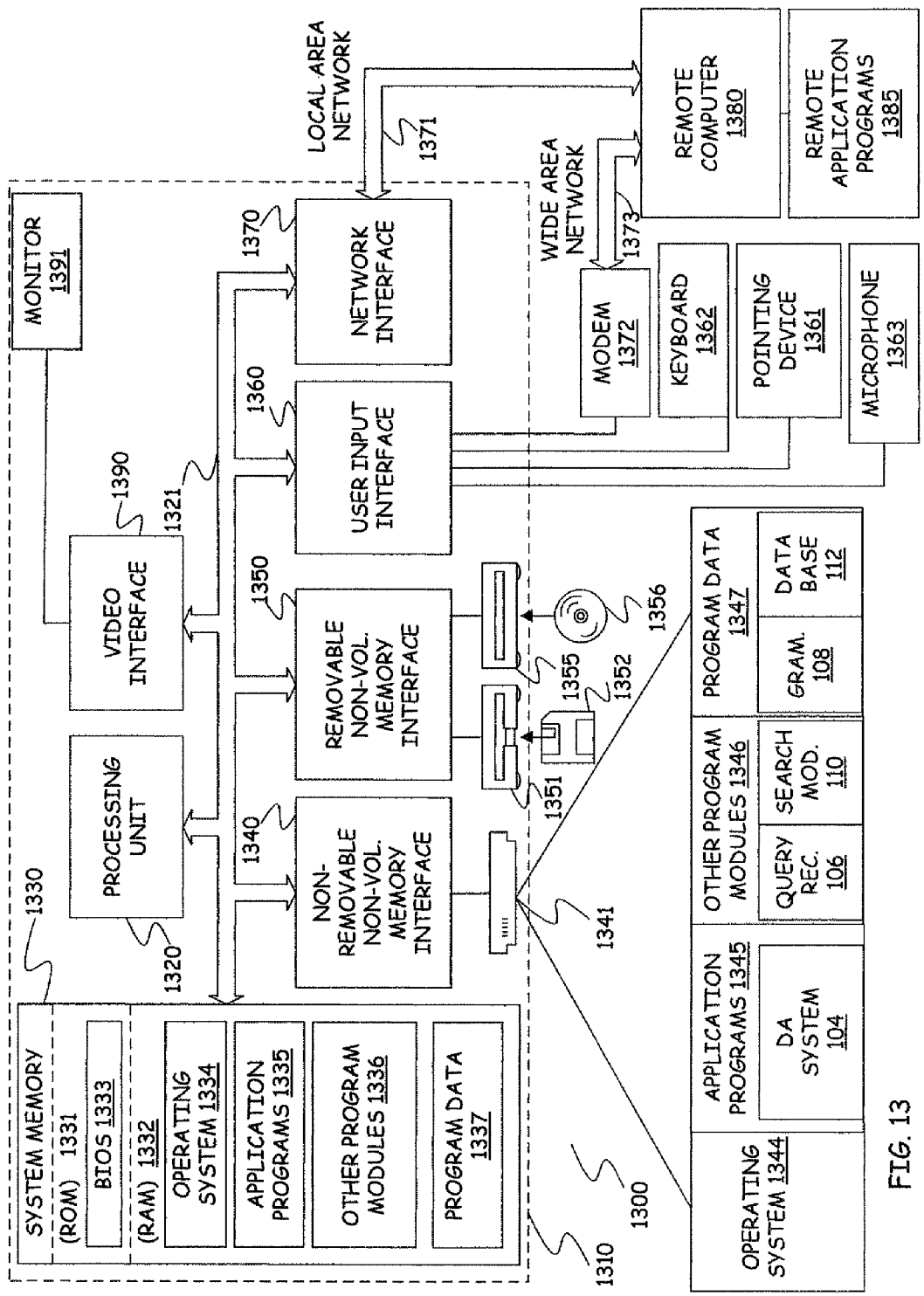
FIG. 13 illustrates an example of a computing system environment.

FIG. 13 illustrates an example of a suitable computing system environment 1300 on which the concepts herein described may be implemented. Nevertheless, the computing system environment 1300 is again only one example of a suitable computing environment for each of these computers and is not intended to suggest any limitation as to the scope of use or functionality of the description below. Neither should the computing environment 1300 be interpreted as having any dependency or requirement relating to any one or combination of components illustrated in the exemplary operating environment 1300.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both locale and remote computer storage media including memory storage devices.

With reference to FIG. 13, an exemplary system includes a general purpose computing device in the form of a computer 1310. Components of computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a locale bus using any of a variety of bus architectures. By way of example, and not limitation, such architectures include Industry Standard Architecture (USA)

bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 1310 typically includes a variety of computer readable media. Computer readable media can be any available media that can be accessed by computer 1310 and includes both volatile and nonvolatile media, removable and non-removable media. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1300.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320.

FIG. 13 illustrates operating system 1334, application programs 1335, other program modules 1336, and program data 1337. Herein, the application programs 1335 (DA system 104), program modules 1336 (query recognizer 106, searching module 110) and program data 1337 (grammar 108, database 112) implement one or more of the concepts described above.

The computer 1310 may also include other removable/non-removable volatile/nonvolatile computer storage media. By way of example only, FIG. 13 illustrates a hard disk drive 1341 that reads from or writes to non-removable, nonvolatile magnetic media, a magnetic disk drive 1351 that reads from or writes to a removable, nonvolatile magnetic disk 1352, and an optical disk drive 1355 that reads from or writes to a removable, nonvolatile optical disk 1356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface, such as interface 1350.

The drives and their associated computer storage media discussed above and illustrated in FIG. 13, provide storage of computer readable instructions, data structures, program modules and other data for the computer 1310. In FIG. 13, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Operating system 1344, application programs 1345, other program modules 1346, and program data 1347 are given different numbers here to illustrate that, at a minimum, they are different copies.

A user may enter commands and information into the computer 1310 through input devices such as a keyboard 1362, a microphone 1363, and a pointing device 1361, such as a mouse, trackball or touch pad. These and other input devices are often connected to the processing unit 1320 through a user input interface 1360 that is coupled to the system bus, but may be connected by other interface and bus structures, such as a parallel port or a universal serial bus (USB). A monitor 1391 or other type of display device is also connected to the system bus 1321 via an interface, such as a video interface 1390.

The computer 1310 may operate in a networked environment using logical connections to one or more remote computers, such as a remote computer 1380. The remote computer 1380 may be a personal computer, a hand-held device, a server, a router, a network PC, a peer device or other common network node, and typically includes many or all of the elements described above relative to the computer 1310. The logical connections depicted in FIG. 13 include a locale area network (LAN) 1371 and a wide area network (WAN) 1373, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the user-input interface 1360, or other appropriate mechanism. In a networked environment, program modules depicted relative to the computer 1310, or portions thereof, may be stored in the remote memory storage device. By way of example, and not limitation, FIG. 13 illustrates remote application programs 1385 as residing on remote computer 1380. It will be appreciated that the network connections shown are exemplary and other means of establishing a communications link between the computers may be used.

It should be noted that the concepts herein described can be carried out on a computer system such as that described with respect to FIG. 13. However, other suitable systems include a server, a computer devoted to message handling or on a distributed system in which different portions of the concepts are carried out on different parts of the distributed computing system.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:
1. A computer system comprising:
a processor;
a database stored on a computer readable storage medium having a plurality of listings,
wherein at least one listing of the plurality of listings includes:

a plurality of unique terms, each term indicative of a textual representation of a word or number, and where:
    at least one term of the plurality of unique terms is indicative of having been changed because the at least one term was duplicative of another term in the plurality of terms in the listing so that said at least one listing thereby comprises at least said another term and said at least one term indicated of having been changed; and at least one term of the plurality of unique terms is the same as a term in another listing of the plurality of listings;
a query recognizer operable on the processor and configured to receive a query from a user and provide recognized content indicative of the query, wherein the recognized content includes a plurality of terms at least some of which comprise duplicative terms;
a search module operable on the processor and configured to receive the recognized content, search the database based on the recognized content and provide at least one listing associated with the query; and
wherein one of the query recognizer or the searching module is configured to:
    modify the recognized content prior to searching the database to change at least one of the duplicative terns in the recognized content to at least one unique term in the recognized content, wherein at least one of the duplicative terms in the recognized content is eliminated by replacing said at least one of the duplicative terms in the recognized content such that all terms in the recognized content are unique and non-duplicative.

2. The computer system of claim 1 wherein the database is a structured database having a plurality of fields and wherein a plurality of listings have terms in each of their corresponding fields, and wherein the search module is configured to search each of the fields based on the recognized content and provide a plurality of listings as search results, and wherein the search module is configured to analyze the search results to discard at least one listing based on the analysis.

3. The computer system of claim 1 wherein the database is a structured database comprising a plurality of fields and wherein a plurality of listings have terms in each of their corresponding fields, wherein the search module is configured to search each of the fields based on the recognized content and provide a plurality of listings as search results, and wherein the search module is configured to analyze the recognized content to discard a term in the recognized content to form a redacted recognized content and search the database results to discard at least one listing based on the analysis.

4. The computer system of claim 1 wherein the database is a structured database comprising a plurality of fields and wherein a plurality of listings have terms in each of their corresponding fields, wherein the search module is configured to search each of the fields based on the recognized content and provide a plurality of listings as search results, wherein the search module is configured to analyze the recognized content to ascertain information therein other than a name in a desired listing, and wherein the searching module is configured to discard one or more listings from the search results based on the information.

5. The computer system of claim 1 wherein each of the listings in the database comprise a sequence of character-based n-grams, and wherein the search module is configured to search the database based on the recognized content in the form of character-based n-grams.

6. The computer system of claim 1 wherein each of the listings in the database comprises phone n-grams, and wherein the search module is configured to search the database based on the recognized content in the form of phone-based n-grams.

7. The computer system of claim 1 wherein the search module is configured to search the database allowing inexact matches between terms in the recognized content and said at least one listing.

8. The computer system of claim 7 wherein the search module is configured to add expanded terms to the recognized content.

9. The computer system of claim 8 wherein the search module is configured to provide a plurality of listings as search results wherein listings attributed to the expanded terms are weighted in correspondence to acoustic similarity of the expanded terms to terms initially in the recognized content.

10. The computer system of claim 1 wherein the search module is configured to provide a plurality of listings as search results; each listing has an associated search score; and wherein the search module is configured to combine the search scores with other scores and rerank the plurality of listings based on the combination of the search scores with the other scores.

11. The computer system of claim 1, wherein the plurality of listings comprise a plurality of business listings, each business listing corresponding to a particular business.

12. The computer system of claim 1, wherein the at least one term of the plurality of unique terms is indicative of having been changed because the at least one term was duplicative of another term in the listing, regardless of terms in other listings.

13. A computer system for searching a database, the system comprising:
    a processor;
    a database having a plurality of listings, each listing having one or more terms;
    a query recognized configured to receive a query from a user and provide recognized content indicative of the query, the recognized content having a number of recognized terms;
    and
    a search module configured to receive the recognized content and generate an expanded recognized content by adding expanded terms to the recognized content using the processor, the expanded recognized content including the expanded terms in addition to the number of recognized terms, wherein the search module is further configured to search the database based on the expanded recognized content and provide at least one listing associated with the query, wherein the search module is configured to search the database allowing inexact matches between terms in the expanded recognized content and said at least one listing, and wherein the search module is configured to provide a plurality of listings as search results based on the expanded terms added to the expanded recognized content and based on inexact matches between terms in the expanded recognized content and said one or more terms in each listing based on probabilities, wherein each of the listings attributed to the expanded terms is weighted in correspondence to similarity of the expanded terms to terms initially in the recognized content.

14. The computer system of claim 13, wherein the database comprises a structured database having a plurality of fields and wherein the plurality of listings have terms in each of their corresponding fields, and wherein the search module is configured to search each of the fields based on the recognized content and provide a plurality of listings as search results, and wherein the search module is configured to analyze the search results to discard at least one listing based on the analysis.

* * * * *